No. 763,536. Patented June 28, 1904.

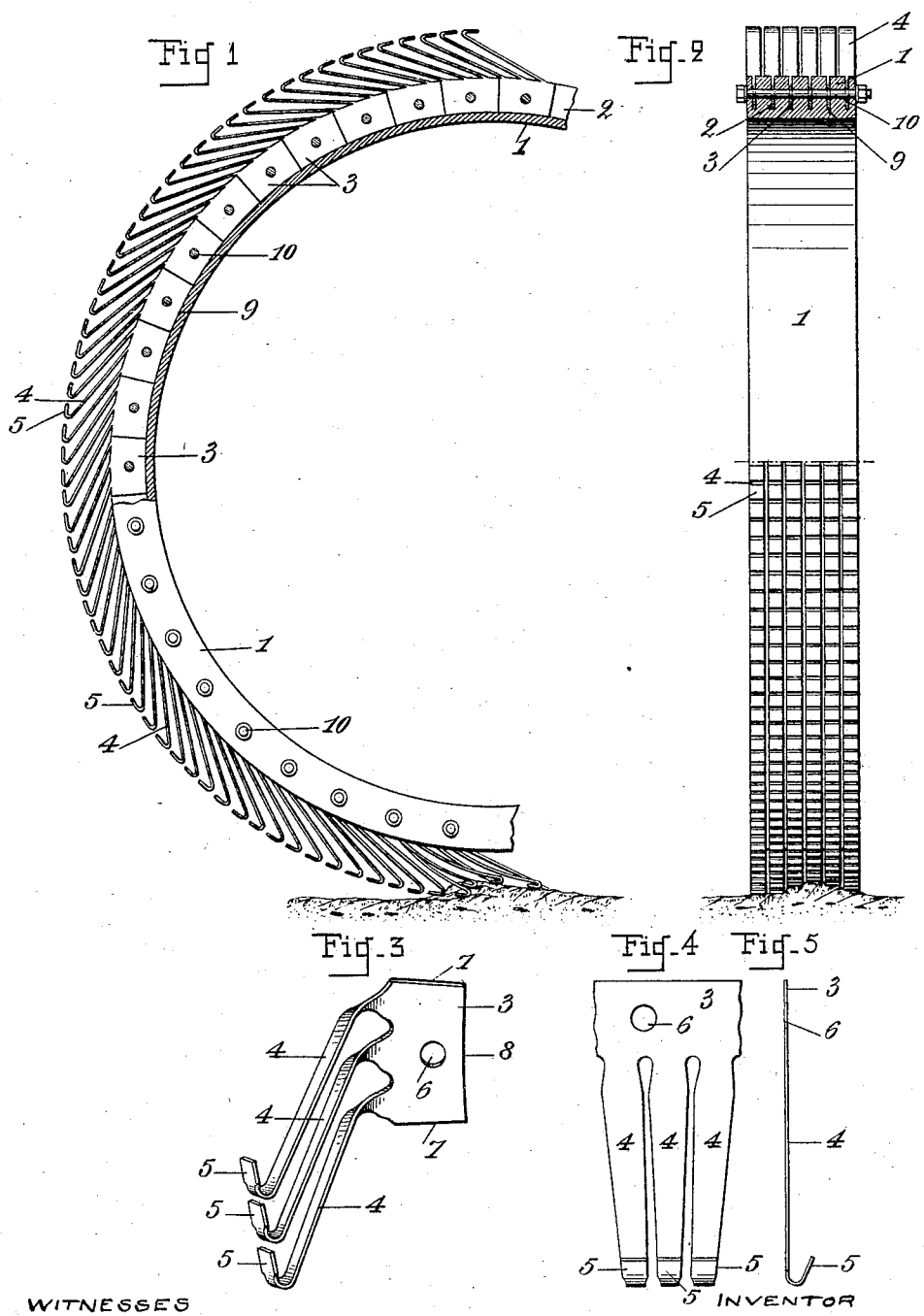

UNITED STATES PATENT OFFICE.

JOSEPH ALLOATTI, OF PARIS, FRANCE.

TIRE FOR VEHICLE-WHEELS.

SPECIFICATION forming part of Letters Patent No. 763,536, dated June 28, 1904.

Application filed February 10, 1904. Serial No. 193,011. (No model.)

*To all whom it may concern:*

Be it known that I, JOSEPH ALLOATTI, a subject of the King of Italy, residing in Paris, France, have invented certain new and useful Improvements in Tires for Vehicle-Wheels, (for which I have obtained a patent in Belgium, No. 168,498, bearing date February 14, 1903,) of which the following is a specification.

My invention has for its object an improved tire for vehicle-wheels, which tire has the resilient characteristics of pneumatic tires, but avoids the drawbacks of side slip and liability to puncture or burst inherent in the latter.

My improved tire belongs to that kind of tire which is formed of elastic or resilient elements arranged on the periphery of the wheel and differs from these similar tires in the points which will be hereinafter explained in the specification.

Hitherto attempts have been made to produce many kinds of tires formed of more or less elastic or resilient elements arranged one behind the other on the periphery of the rim, preventing the rim from resting directly on the ground. The general drawback of all these arrangements consists in the tire formed not being in reality as flexible or resilient as pneumatic tires for the following reason: When a pneumatic tire encounters an obstacle, it is capable of being sufficiently deformed to exactly fit the form of the obstacle, the result of which is that the obstruction or projection presented by the latter disappears, being actually absorbed by the deformation of the tire, which is described by the expression "that the pneumatic tire has absorbed the obstacle." Tires formed of resilient or elastic elements arranged one behind the other, however, in such a way that each of them occupies the whole width of the rim are not deformable in the direction of the generating-line of said rim, seeing that whatever may the point of this generating-line where the uppermost projection of the obstacle is situated the whole element which is fixed on this generating-line is lifted to the level of the highest point of the obstacle which it encounters. The result of this is that even if these kinds of tires are able to diminish jolting they cannot suppress it, and, further, side slip is with them constantly to be feared, seeing that where there is the least irregularity in the ground the above-mentioned parts or elements only rest on the ground at a single point. My improved tire removes these serious drawbacks and for this object is formed of successive rows of elastic or resilient elements arranged on the periphery of the rim, each row being composed of several independent elastic or resilient elements fixed side by side on a generating-line (which is common to all) of the rim and the rows thus formed fixed one behind the others on equidistant generating-lines sufficiently close together to allow of the elements of several adjacent rows being able to come simultaneously in contact with the ground.

In the accompanying drawings there is shown as an example, in Figure 1, a lateral elevation, partially in section, of a half-rim made in accordance with my invention; Fig. 2, a front elevation, partially in section, of the same; Fig. 3, a view in perspective, on an enlarged scale, of one of the elastic or resilient elements constituting the rim. Figs. 4 and 5 are views, on an enlarged scale, in front and side elevation, respectively, of a modification of the arrangement of this same element.

In order to carry out the object of my invention, I employ any suitable rim 1, in which I form a series of equidistant grooves 2, arranged in the form of construction shown in Figs. 1, 2, and 3 in parallel rings, having their center on the axis of the wheel. I introduce into these grooves a series of parts formed as shown in Fig. 3—that is to say, consisting of a metal plate 3, with which several elastic elements, such as 4, are attached, the free ends of which elements are bent back in the form of a hook 5. The plate 3 is perforated at 6, and its edges 7 are arranged so as to radiate from the center of the rim when the said plate is inserted in one of the grooves 2. The other edge, 8, of the plate 3 has a curvature of the same radius as the circle 9 of the bottom of the grooves 2. I thus arrange one behind the other in each of the grooves 2 the necessary number of parts, such as shown in Fig. 3, so as thus to constitute in each groove a continuous ring, as indicated in Fig. 1, and over the whole surface of the rim a continuous tire, as indicated in Fig. 2. Finally, I fix the parts or elements on the rim by means of bolts 10, which pass through the holes 6 in the parts which are in alinement, as shown in Fig. 2 of the accompanying drawings.

In the modified form of construction shown in Fig. 4 the elastic or resilient elements 4 are no longer arranged one behind the other, as in the case of Fig. 3, but side by side on the plate 3 and in the plane of this latter, which in this case is as wide as the rim. The mounting is done in a similar manner to the mounting described, with the sole difference that the grooves 2 instead of being arranged in parallel rings concentric to the rim are arranged in successive equidistant planes at right angles to the plane of the rim and inclined on the periphery of this latter to an angle equal to that which the elastic or resilient elements 4 are to make with the said periphery. Finally, the bolts 10, which pass through the holes 6, instead of being arranged at right angles to the plane of the rim are located in said plane and in a direction practically at right angles to the plate 3. Under these conditions of arrangement it is quite evident that if an obstacle be encountered by the wheel the elastic or resilient elements of the same row will be able to bend indvidiually, as indicated in Fig. 2, while the elements of several consecutive rows will also be able to be individually displaced on contact with the obstacle, as indicated in Fig. 1. The result is that the tire will yield to the form of the obstacle which it encounters absolutely in the same manner as a pneumatic tire would do, and much more so as the number of elements per row and the number of rows is increased. Under these conditions it is evident that the tire possesses a number of points of contact with the ground equal to the product of the number of elements of one row by the number of rows which rest simultaneously on the ground. This large number of elastic or resilient elements simultaneously in contact with the ground produces an effect at least equivalent to that of a pneumatic tire as regards diminishing vibration or jolting, and therefore in view of the independence of the elastic elements forming each row the tire will rest on the ground by a more extended surface of contact than that of an inflated pneumatic tire, and consequently the said tire will greatly diminish the chances of side slip, and wheels thus formed will have great actual adhesion.

I declare that what I claim is—

1. In a wheel of the kind hereinbefore described, the combination with a rim having parallel grooves, of a series of parts comprising a base-plate engaging in said grooves, and elastic strips carried by said plate, said strips projecting at the exterior of the grooves and having their free ends bent back in the form of a hook in order to come in contact with the ground; substantially as described.

2. In a wheel of the kind hereinbefore mentioned, the combination with a rim provided with parallel grooves equidistant from and concentric with the said rim, of a series of parts comprising a base-plate engaging in said grooves, and elastic strips projecting at the exterior of said grooves, said parts being arranged in each groove one behind the other and having in their base-plate a hole enabling the piece to be fixed to the rim by a bolt, said base-plates being arranged in each groove, in such a way that the holes of all the plates arranged across the width of the rim are opposite one another, and are traversed by the same bolt; substantially as described.

In witness whereof I have hereunto set my hand in presence of two witnesses.

JOSEPH ALLOATTI.

Witnesses:
HANSON C. COXE,
JULES FAYOLLET.